(12) United States Patent
Kalyanasundharam et al.

(10) Patent No.: US 12,066,944 B2
(45) Date of Patent: Aug. 20, 2024

(54) ZERO VALUE MEMORY COMPRESSION

(71) Applicant: Advanced Micro Devices, Inc., Santa Clara, CA (US)

(72) Inventors: Vydhyanathan Kalyanasundharam, Santa Clara, CA (US); Amit P. Apte, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/723,780

(22) Filed: Dec. 20, 2019

(65) Prior Publication Data

US 2021/0191865 A1 Jun. 24, 2021

(51) Int. Cl.
*G06F 12/0815* (2016.01)
*G06F 12/0817* (2016.01)
*G06F 12/0888* (2016.01)
*G06F 12/0891* (2016.01)

(52) U.S. Cl.
CPC ...... *G06F 12/0815* (2013.01); *G06F 12/0817* (2013.01); *G06F 12/0888* (2013.01); *G06F 12/0891* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 6,973,543 B1 | 12/2005 | Hughes | |
| 7,356,650 B1 * | 4/2008 | Englin | G06F 12/0811 711/134 |
| 9,418,016 B2 * | 8/2016 | Steely, Jr. | G06F 12/0804 |
| 2005/0071573 A1 * | 3/2005 | Dodson | G06F 12/0831 711/145 |
| 2007/0113020 A1 * | 5/2007 | Gunna | G06F 12/0808 711/141 |
| 2007/0186054 A1 | 8/2007 | Kruckemyer et al. | |
| 2009/0119461 A1 * | 5/2009 | Cypher | G06F 12/0808 711/E12.001 |
| 2011/0119451 A1 * | 5/2011 | Fuller | G06F 12/0802 711/144 |
| 2011/0161596 A1 * | 6/2011 | Conte | G06F 12/0817 711/E12.017 |
| 2011/0213933 A1 * | 9/2011 | Maeda | G06F 12/082 711/143 |

(Continued)

OTHER PUBLICATIONS

Extended European Search Report for corresponding European Patent Application No. 209041921 2023.

*Primary Examiner* — Kaushikkumar M Patel
(74) *Attorney, Agent, or Firm* — Volpe Koenig

(57) ABSTRACT

A coherency management device receives requests to read data from or write data to an address in a main memory. On a write, if the data includes zero data, an entry corresponding to the memory address is created in a cache directory if it does not already exist, is set to an invalid state, and indicates that the data includes zero data. The zero data is not written to main memory or a cache. On a read, the cache directory is checked for an entry corresponding to the memory address. If the entry exists in the cache directory, is invalid, and includes an indication that data corresponding to the memory address includes zero data, the coherency management device returns zero data in response to the request without fetching the data from main memory or a cache.

25 Claims, 7 Drawing Sheets

(56) References Cited

U.S. PATENT DOCUMENTS

| | | | |
|---|---|---|---|
| 2014/0032829 A1* | 1/2014 | Solihin | G06F 12/0817 |
| | | | 711/105 |
| 2014/0229680 A1* | 8/2014 | Solihin | G06F 12/082 |
| | | | 711/135 |
| 2016/0062902 A1* | 3/2016 | Kamezawa | G06F 12/0893 |
| | | | 711/135 |
| 2016/0092354 A1* | 3/2016 | Steely, Jr. | G06F 12/0824 |
| | | | 711/141 |
| 2016/0217080 A1* | 7/2016 | Solihin | G06F 12/0879 |
| 2016/0246723 A1* | 8/2016 | Doshi | G06F 9/30047 |
| 2017/0103019 A1 | 4/2017 | Rahme et al. | |
| 2018/0004659 A1 | 1/2018 | Greenspan | |
| 2018/0095756 A1* | 4/2018 | Hasenplaugh | G06F 9/30036 |
| 2018/0165199 A1* | 6/2018 | Brandt | G06F 12/0831 |
| 2018/0285280 A1* | 10/2018 | Akin | G06F 12/0888 |
| 2019/0079779 A1* | 3/2019 | Lee | G06F 9/44521 |
| 2019/0155731 A1* | 5/2019 | Hagersten | G06F 12/0864 |
| 2020/0183585 A1* | 6/2020 | Williams | G06F 3/0607 |
| 2021/0034530 A1* | 2/2021 | Natrayan | G06F 12/0862 |

* cited by examiner

ZERO VALUE MEMORY COMPRESSION

BACKGROUND

The main memory of a computer system typically includes relatively inexpensive and high density memory devices, such as dynamic random access memory (DRAM) devices. Access times for such devices are typically relatively long however. Accordingly, computer systems also typically include at least one cache memory to improve performance. Cache memories are relatively high-speed memory devices that are typically situated in relatively close proximity to a processor. In a multi-processor computer system, each processor (or processor core) typically has its own dedicated level one (L1) cache, and in some cases shares other caches (e.g., level two (L2), level three (L3)) with other processors or processor cores.

In multi-node computer systems where each node (e.g., processor, core, or core complex) has a dedicated cache, techniques are implemented to maintain coherency of data that is being used by different nodes. For example, if a processor attempts to access data stored in main memory at a certain memory address, it must first determine whether the data corresponding to that memory address is stored in another cache and has been modified. Some such approaches include a cache directory which is used to keep track of the cache lines that are currently in use by the system. In some cases, a cache directory improves memory bandwidth by reducing the number of memory requests and probe requests that are required by the computer system. Cache directories are typically oversized (by a "guard band") e.g., to handle local "hot-spotting" of certain data sets during application run time. Accordingly, applications typically leave spare unused entries in the cache directory.

In some applications, a processor writes zero data (i.e., data which includes only zeros) to main memory. Such applications may include memory erasures (e.g., clearing memory to use for another purpose) or storing datasets which feature a high degree of data sparsity (e.g., machine learning data).

BRIEF DESCRIPTION OF THE DRAWINGS

A more detailed understanding can be had from the following description, given by way of example in conjunction with the accompanying drawings wherein.

DETAILED DESCRIPTION

Figure 1:
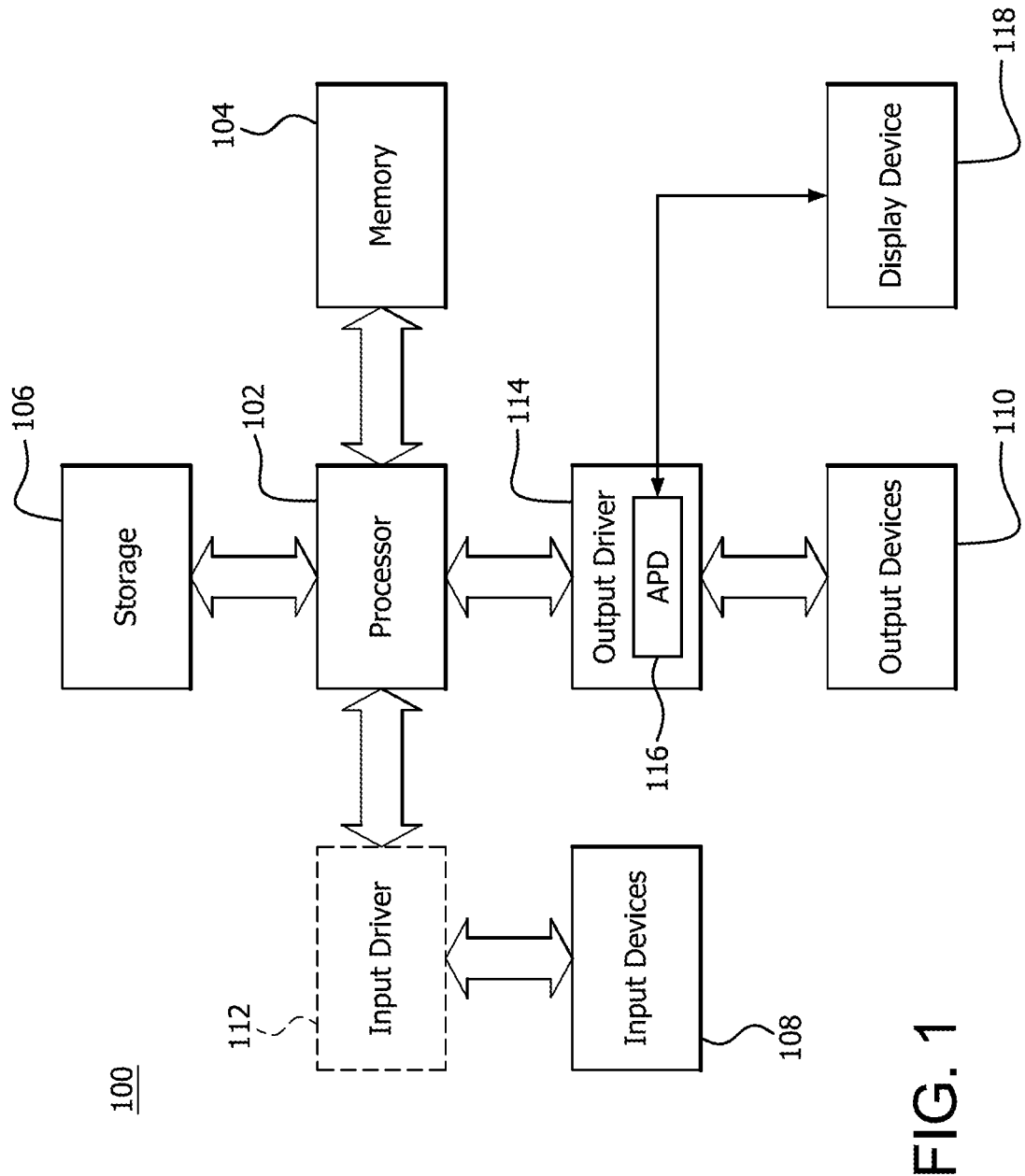
FIG. 1 is a block diagram of an example device in which one or more features of the disclosure can be implemented.

Some implementations provide a coherency management device. The coherency management device includes circuitry that receives a request to read data stored at an address in a main memory. The coherency management device also includes circuitry that determines whether a cache directory includes a cache directory entry corresponding to the address. The coherency management device also includes circuitry that determines whether the cache directory entry is invalid, if the cache directory includes the cache directory entry corresponding to the address. The coherency management device also includes circuitry that determines whether the cache directory entry includes an indication that data corresponding to the memory address includes zero data, if the cache directory entry is invalid. The coherency management device also includes circuitry that returns zero data in response to the request, if the cache directory entry includes the indication.

In some implementations of the coherency management device, the indication includes a bit in the cache directory entry. In some implementations, the indication includes a spare state in a state field of the cache directory entry. In some implementations, the indication includes at least one bit in a state field of the cache directory entry. In some implementations, the indication includes a bit in a sharing vector field of the cache directory entry. In some implementations, the coherency management device returns the zero data in response to the request without reading the main memory if the cache directory entry is invalid and includes the indication. In some implementations, the coherency management device includes a coherent slave device, probe filter device, and/or snoop filter device. In some implementations, the coherency management device receives the request from a coherent master device. In some implementations, the request includes a non-temporal read operation.

Some implementations provide a method, implemented in a coherency management device, for managing cache coherence in a computer system. The method includes receiving a request to read data stored at an address in a main memory and determining whether a cache directory includes a cache directory entry corresponding to the address. The method also includes determining whether the cache directory entry is invalid, if the cache directory includes the cache directory entry corresponding to the address. The method also includes determining whether the cache directory entry includes an indication that data corresponding to the memory address includes zero data, if the cache entry is invalid. The method also includes returning zero data in response to the request, if the cache directory entry includes the indication.

In some implementations of the method, the indication includes a bit in the cache directory entry. In some implementations, the indication includes a spare state in a state field of the cache directory entry. In some implementations, the indication includes at least one bit in a state field of the cache directory entry. In some implementations, the indication includes a bit in a sharing vector field of the cache directory entry. In some implementations, if the cache directory entry is invalid and includes the indication, the coherency management device does not allocate cache entries in the system corresponding to the request. In some implementations, if the cache directory entry is invalid and includes the indication, the coherency management device returns the zero data in response to the request without reading the main memory. In some implementations, the coherency management device includes a coherent slave device, probe filter device, and/or snoop filter device. In some implementations, the coherency management device receives the request from a coherent master device. In some implementations, the request includes a non-temporal read operation.

Some implementations provide a coherency management device. The coherency management device includes circuitry that receives a request to write data to an address in a main memory. The coherency management device also includes circuitry that determines whether the data includes zero data. The coherency management device also includes circuitry that determines whether a cache directory includes a cache directory entry corresponding to the address. The coherency management device also includes circuitry that, if the data includes zero data and the cache directory includes the cache directory entry, sets a state of the cache directory entry as invalid and sets, in the cache directory entry, an indication that data corresponding to the memory address includes zero data. The coherency management device also includes circuitry that, if the cache directory does not include the cache directory entry, creates the cache directory entry, sets the state of the cache directory entry as invalid and sets, in the cache directory entry, the indication that data corresponding to the memory address includes zero data.

In some implementations, the determining, by the coherency management device, whether the data includes zero data includes determining, by the coherency management device, whether the data includes only zeros. In some implementations, the determining, by the coherency management device, whether the data includes zero data includes determining, by the coherency management device, whether the request includes an instruction which includes an opcode which instructs a write of zeros to the address. In some implementations, the indication includes at least one bit in a state field of the cache directory entry. In some implementations, the indication includes a bit in a sharing vector field of the cache directory entry. In some implementations, the coherency management device sets the indication in response to the request without writing to the main memory if the data includes zero data. In some implementations, the coherency management device includes a coherent slave device, probe filter device, and/or snoop filter device. In some implementations, the coherency management device receives the request from a coherent master device. In some implementations, the request includes a non-temporal write operation.

Some implementations provide a method, implemented in a coherency management device, for managing cache coherence in a computer system. The method includes receiving a request to write data to an address in a main memory; determining whether the data includes zero data; and determining whether a cache directory includes a cache directory entry corresponding to the address. The method also includes, if the data includes zero data and the cache directory includes the cache directory entry, setting a state of the cache directory entry as invalid and setting an indication, in the cache directory entry, that data corresponding to the memory address includes zero data. The method also includes, if the cache directory does not include the cache directory entry, creating the cache directory entry, setting a state of the cache directory entry as invalid and setting, in the cache directory entry, the indication that data corresponding to the memory address includes zero data.

In some implementations of the method, determining, by the coherency management device, whether the data includes zero data includes determining, by the coherency management device, whether the data includes only zeros. In some implementations, determining, by the coherency management device, whether the data includes zero data includes determining, by the coherency management device, whether the request includes an instruction which includes an opcode which instructs a write of zeros to the address. In some implementations, the indication includes at least one bit in a state field of the cache directory entry. In some implementations, the indication includes a bit in a sharing vector field of the cache directory entry. In some implementations, if the data includes zero data, the coherency management device sets the indication in response to the request without writing the main memory. In some implementations, the coherency management device includes a coherent slave device, probe filter device, and/or snoop filter device. In some implementations, the coherency management device receives the request from a coherent master device. In some implementations, the request includes a non-temporal write operation.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
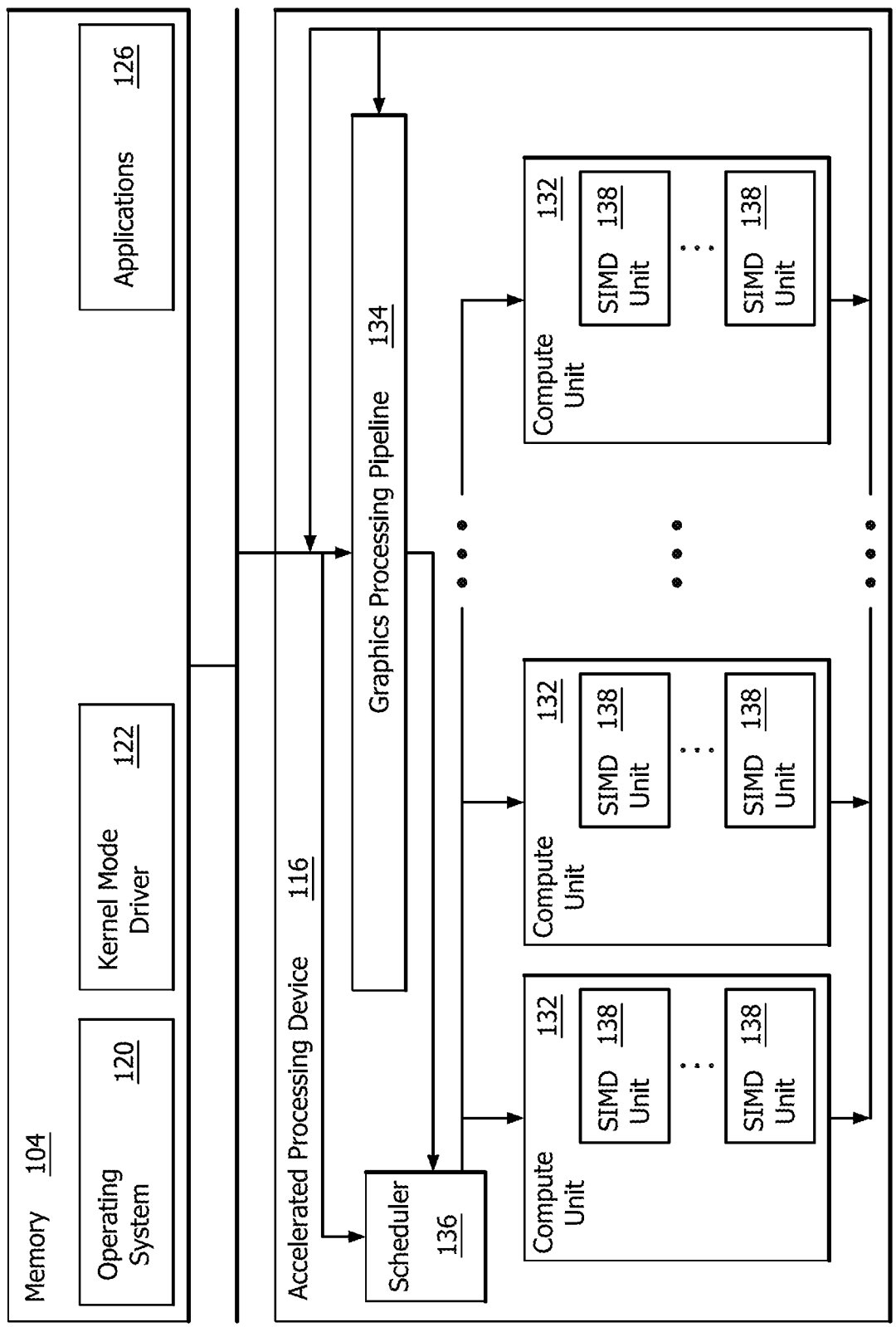
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
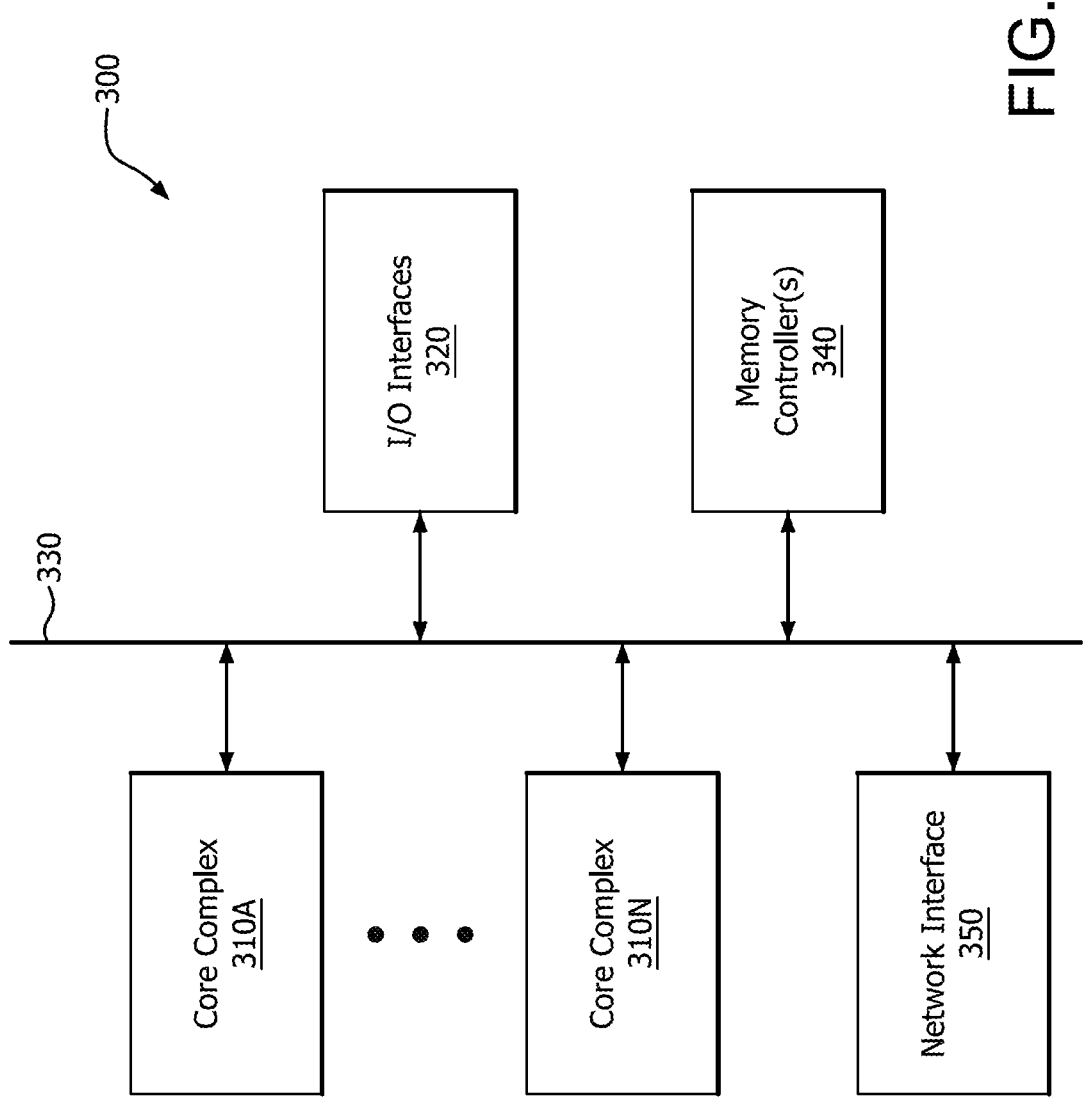
FIG. 3 is a block diagram illustrating portions of an example computing system.

FIG. 3 is a block diagram illustrating portions of an example computing system 300. In some examples, computing system 300 is implemented using some or all of device 100, as shown and described with respect to FIGS. 1 and 2. Computing system 300 includes one or more core complexes 310A-N, input/output (I/O) interfaces 320, interconnect 330, memory controller(s) 340, and network interface 350. In other examples, computing system 300 includes further components, different components, and/or is arranged in a different manner.

In some implementations, each of core complexes 310A-N includes at least one processing device. In this example, at least one of core complexes 310A-N includes one or more general purpose processing devices, such as CPUs. It is noted that a "core complex" is also be referred to as a "processing node" in some cases. In some implementations, such processors are implemented using processor 102 as shown and described with respect to FIG. 1. In this example, at least one of core complexes 310A-N includes one or more data parallel processors. Examples of data parallel processors include GPUs, digital signal processors (DSPs), field programmable gate arrays (FPGAs), application specific integrated circuits (ASICs), and so forth. In some implementations, such processors are implemented using APD 116 as shown and described with respect to FIG. 1.

In some implementations, each processor core within a core complex 310A-N includes a cache subsystem with one or more levels of caches. In some implementations, each core complex 310A-N includes a cache (e.g., level three (L3) cache) which is shared among multiple processor cores.

Memory controller 340 includes at least one memory controller accessible by core complexes 310A-N, e.g., over interconnect 330. Memory controller 340 includes one or more of any suitable type of memory controller. Each of the memory controllers are coupled to (or otherwise in communication with) and control access to any number and type of memory devices (not shown). In some implementations, such memory devices include Dynamic Random Access Memory (DRAM), Static Random Access Memory (SRAM), NAND Flash memory, NOR flash memory, Ferroelectric Random Access Memory (FeRAM), and/or any other suitable memory device. Interconnect 330 includes any computer communications medium suitable for communication among the devices shown in FIG. 3, such as a bus, data fabric, or the like.

I/O interfaces 320 include one or more I/O interfaces (e.g., peripheral component interconnect (PCI) bus, PCI-Extended (PCI-X), PCIE (PCI Express) bus, gigabit Ethernet (GBE) bus, universal serial bus (USB), and the like). In some implementations, I/O interfaces 320 are implemented using input driver 112, and/or output driver 114 as shown and described with respect to FIG. 1. Various types of peripheral devices can be coupled to I/O interfaces 320. Such peripheral devices include (but are not limited to) displays, keyboards, mice, printers, scanners, joysticks or other types of game controllers, media recording devices, external storage devices, network interface cards, and so forth. In some implementations, such peripheral devices are implemented using input devices 108 and/or output devices 118 as shown and described with respect to FIG. 1.

Figure 4:
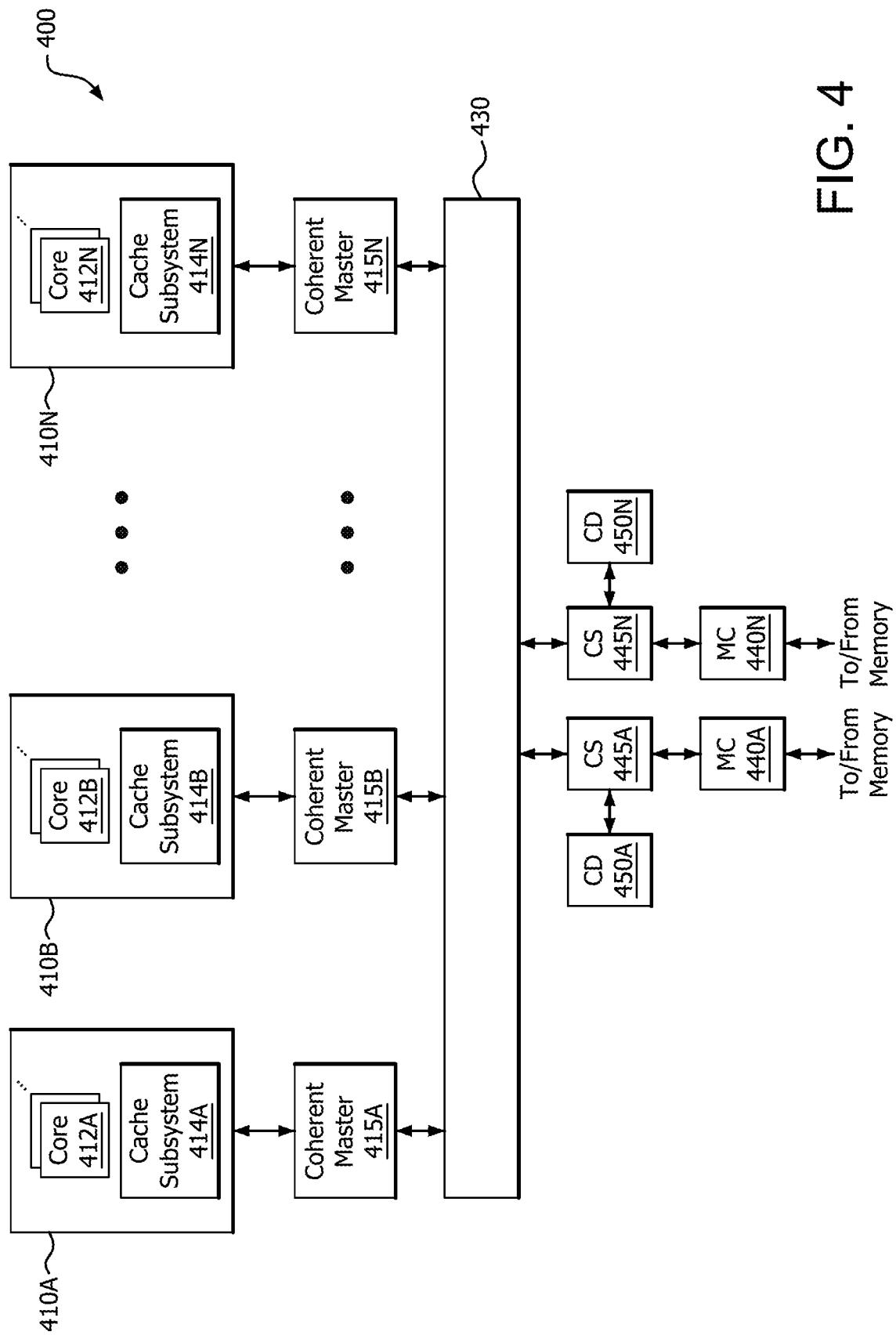
FIG. 4 is a block diagram illustrating portions of an example multi-processor computing system.

FIG. 4 is a block diagram illustrating portions of an example multi-processor computing system 400. System 400 includes one or more core complexes 410A-N and one or more memory controllers 440A-N in communication with core complexes 410A-N over interconnect 430 (e.g., via other components). In some examples, core complexes 410A-N are coupled to interconnect 430 via coherent masters 415A-N, and memory controllers 440A-N are coupled to interconnect 430 via coherent slaves 445A-N. Interconnect 430 includes any computer communications medium suitable for communication among the devices shown in FIG. 4, such as a bus, data fabric, or the like. It is noted that processor system 400 is described relative to core complexes for the sake of example, however in other implementations processing nodes include a single processor, processor cores that are not implemented in a core complex, or any other suitable processing node.

Each of core complexes 410A-N includes one or more processor cores 412A-N, respectively. It is noted that in some implementations, the processing devices are not organized in core complexes. In some cases, such processors are referred to as such (e.g., as processing devices) rather than as core complexes. Each core complex 410A-N also includes a corresponding cache subsystem 414A-N. Each cache subsystem 414A-N includes any suitable number of cache levels and any suitable cache hierarchy structure usable to support caching for core complexes 410A-N.

Each core complex 410A-N communicates with a corresponding coherent master 415A-N. In some implementations, a coherent master is an agent that processes traffic flowing over an interconnect (e.g., interconnect 430) and manages coherency for a connected CPU or core complex. In some implementations, to manage coherency, a coherent master receives and processes coherency-related messages and probes, and generates and transmits coherency-related requests and probes.

Each core complex 410A-N communicates with one or more coherent slaves 445A-N via its corresponding coherent master 415A-N and over interconnect 430. A coherent slave is an agent device that manages coherency for a memory controller (e.g., a memory controller connected to the coherent slave). In some implementations, to manage coherency, a coherent slave receives and processes requests and probes that target a corresponding memory controller.

Core complex 410A communicates with coherent slave 445A through coherent master 415A and interconnect 430 in the example of FIG. 4. Coherent slave (CS) 445A communicates with memory controller (MC) 440A, which controls a memory device (e.g., a main memory DRAM device).

Coherent slaves 445A-N are each in communication with (or include) a respective cache directory (CD) 450A-N. In some cases, a cache directory is referred to as a "probe filter". Cache directory 450A, for example, includes entries for memory addresses or regions of a memory accessible through memory controller 440A, which are cached in cache lines of system 400 (e.g., cache subsystems 414A-N). In some implementations, each core complex 410A-N is in communication with any suitable number of memory controllers 440A-N via a corresponding coherent master 415A-N and corresponding coherent slaves 445A-N.

Probes include messages passed from a coherency point (e.g., the coherent slave) to one or more caches in the computer system to request a response indicating whether the caches have a copy of a block of data and, in some implementations, to indicate a cache state into which the cache should place the block of data. In some implementations, if a coherent slave receives a memory request targeting its corresponding memory controller (e.g., a memory request for data stored at an address or a region of addresses in a memory controlled by the memory controller for which the coherent slave manages coherency), the coherent slave performs a lookup (e.g., a tag-based lookup) to its corresponding cache directory to determine whether the request targets a memory address or region cached in at least one cache line of any of the cache subsystems.

In some implementations, cache directories track cache regions, where a region includes a plurality of cache lines. The size of the region being tracked can vary from embodiment to embodiment. It is noted that a "region" can also be referred to as a "page" herein. In some such implementations, if a coherent slave receives a cache request, the coherent slave determines the region which is targeted by the request, and performs a lookup for this region in the cache directory. If the lookup results in a hit, then the coherent slave sends a probe to the CPU(s) which are identified in the hit entry. The type of probe that is generated by the coherent slave depends on the coherency state specified by the hit entry. It is noted that examples discussed herein using line-based tracking are also implementable using region-based tracking.

In some implementations, interconnect 430 is connected to and/or in communication with other components, which are not shown in FIG. 4 for ease of description. For example, in some implementations, interconnect 430 includes connections to one or more I/O interfaces and/or one or more I/O devices (e.g., corresponding to I/O interfaces 320 and network interfaces 350 as shown and described with respect to FIG. 3).

Figure 5:
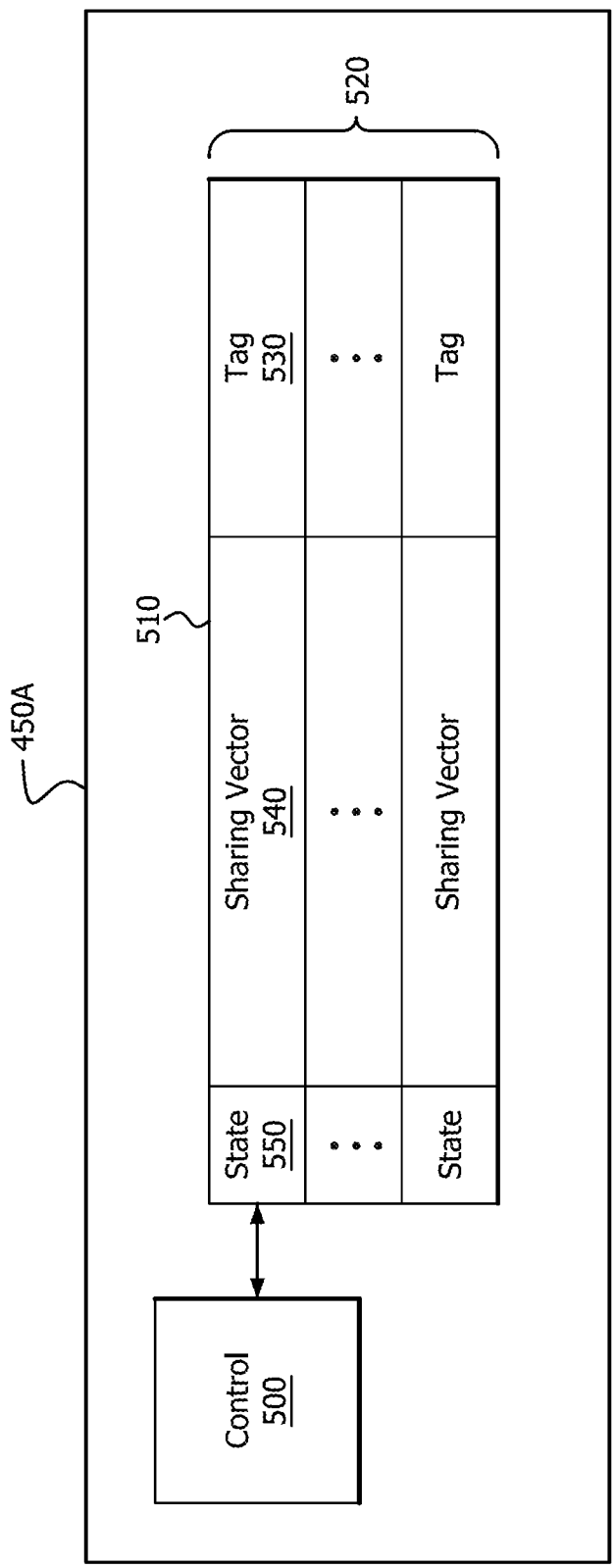
FIG. 5 is a block diagram illustrating an example implementation of a cache directory.

FIG. 5 is a block diagram illustrating an example implementation of cache directory 450A as shown and described with respect to FIG. 4. Cache directory 450A includes a control unit 500 and an array 510. Array 510 includes any suitable number of directory entries 520 for storing states of memory addresses or regions. The number of directory entries 520 is sized to achieve a suitable level of thrash, and accordingly, there are typically a number of spare directory entries 520 available (e.g., in an invalid state) which are usable opportunistically (i.e., if available) for other purposes, such as zero tracking as discussed herein.

In some implementations, each of directory entries 520 includes a state field 550, sharing vector field 540, and tag field 530. In some implementations, the directory entries 520 include other fields, different fields, and/or are arranged in another suitable manner. Tag field 530 includes a plurality of address bits which specify a subset of the bits of a memory address. In some implementations, tag field 530 includes all of the bits of the memory address. In some such cases, the field may be referred to as an address field. The bits of tag field 530 identify a memory location or group of memory locations in a memory which map to the directory entry. In this example, tag field 530 indicates a subset of the address bits of a memory location in a memory (e.g., DRAM) controlled by memory controller 440A, shown and described with respect to FIG. 4.

Sharing vector 540 includes a plurality of bits that indicate which, if any, caches in the system have a copy of a cache line that is mapped to the directory entry 520. In this example, sharing vector 540 indicates which, if any, of cache subsytems 414A-N have a cached copy of the cache line corresponding to directory entry 520. State field 550 includes one or more state bits that specify the state of the directory entry 520. In some implementations, state field 550 may indicate that the particular directory entry 520 as in a particular state. A suitable number of bits for indicating the various states is provided. For example, where three states are represented by state field 550, two bits are used in some implementations. It is noted that this arrangement provides an extra unused bit value for state field 550. Similarly, where six states are represented by state field 550, three bits are used in some implementations. It is noted that this arrangement provides an extra two unused bit values for state field 550.

Figure 6:
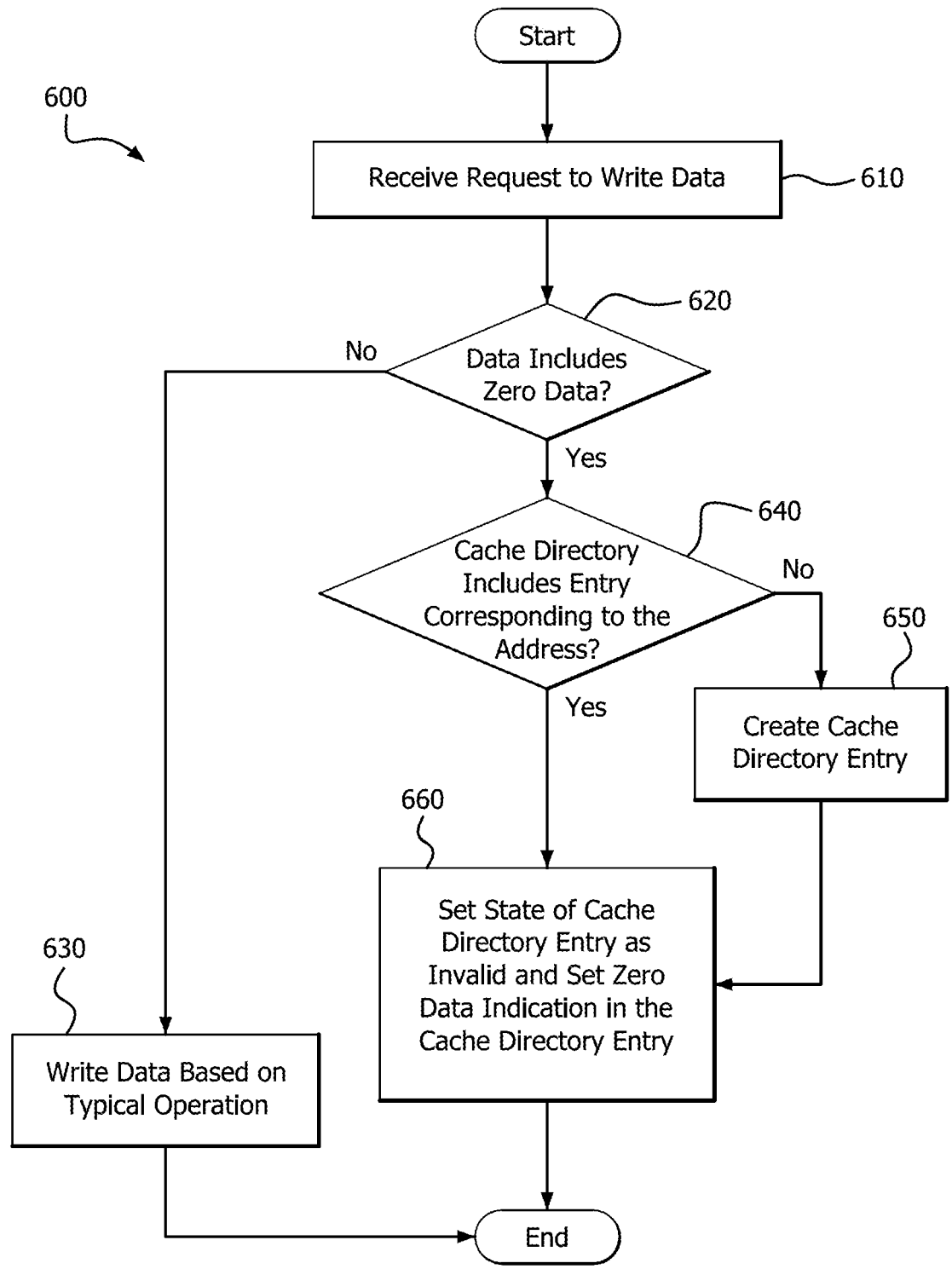
FIG. 6 is a flow chart illustrating an example method for zero data compression by a coherence management device during a write operation.

FIG. 6 is a flow chart illustrating an example method 600 for zero data compression by a coherence management device, such as a coherent slave as discussed herein or other suitable coherence management device, during a write operation.

In step 610, the coherence management device receives a request to write data to an address in a main memory, and determines whether the request is to write zero data. In some implementations, the request includes a non-temporal write operation. Non-temporal write operations bypass the cache structure, but are observable by the coherence management device. In some implementations, the coherence management device determines whether the request is to write zero data based on the payload of the request (e.g., if the data contained in the payload is all zeros). It is noted that in other implementations, other kinds of data can be detected for compression in this manner, such as a payload of all ones, or a payload having a predetermined pattern. In some implementations, the coherence management device determines whether the request is to write zero data based on the opcode of the request (e.g., if the opcode indicates a particular type of write instruction which writes zero data).

On condition 620 that the request is to write data other than zero data, the coherence management device handles writing of the data based on typical operations in step 630 (e.g., performs a cache directory lookup, cache invalidations, and writes to memory as appropriate). Otherwise, if the request is to write zero data, the coherence management device determines whether an entry in a cache directory with which it is associated includes an entry corresponding to the memory address. In some implementations, the coherence management device makes this determination by comparing the memory address to tag fields in the cache directory entries which include memory addresses or portions of memory addresses (or passing the request to the cache directory, which makes the comparisons).

On condition 640 that the cache directory includes an entry corresponding to the address, the state of the cache directory entry is set as invalid to indicate that no cached copies (e.g., in cache subsystems 414A-N) of the data are valid, and a zero indication is set in the cache directory entry, in step 660. In some implementations, a spare state is set in the cache directory entry to indicate both invalidity and zero data. On condition 640 that the cache directory does not include an entry corresponding to the address, and if spare, unused or invalid entries are available in the cache directory, the cache directory creates an entry corresponding to the address in step 650 before the state of the cache directory entry is set as invalid, and sets a zero indication in the cache directory entry (or sets a spare state to indicate both), in step 660. If spare, unused or invalid entries are not available in the cache directory, the coherence management device handles writing of the data based on typical operations as in step 630 (e.g., performs a cache directory lookup, cache invalidations, and writes to memory as appropriate).

The operations in step 660 are performed in any suitable order, or are performed simultaneously or concurrently. In some implementations, the zero data indication is a bit in the cache directory entry. A bit used for zero data indication in this way can be referred to as a "zero detect" or "ZD" bit. In some implementations, the ZD bit is a repurposed bit of a sharing vector of the cache directory entry. For example, an invalid entry implicitly indicates that none of the cache subsystems 414A-N has a valid copy of the data corresponding to the address in main memory cached. Accordingly, the sharing vector is not necessary to indicate which caches include valid copies, and can be repurposed for other indications, such as to indicate zero data.

In some implementations, the zero indication is a spare state set in a state field of the cache directory entry. For example, if the state field includes two bits to represent three states (e.g., cached, invalid, exclusive), a spare state exists because two bits can be used to represent four states using binary encoding. Accordingly, the spare state can be assigned as a zero detect or ZD state. In some such implementations, the ZD state functions as an invalid state and also indicates that data corresponding to the address in main memory is zero data.

In some implementations the zero data is not written to the main memory, or is not written to the main memory at this time. This can have the advantage of saving memory bandwidth in some cases. It is not necessary to write the data to main memory at the time a zero data indication is set in a corresponding cache directory, in some implementations, because a corresponding read operation will return zero data based on the indication in the cache directory entry (e.g., ZD bit or ZD state). Some implementations that do not write the zero data to main memory at the time a zero data indication is set in a corresponding cache directory entry include logic that writes the zero data to main memory if the cache directory entry is evicted.

Likewise, in some implementations the zero data is not cached (e.g., is not allocated in any of cache subsystems 414A-N). In such implementations, the zero data is not cached because the cache entry is set invalid and/or to a ZD state such that zero data is returned without the need to fetch the data from any cache or main memory. This can have the advantage of saving bus bandwidth by not requiring a probe request to a cache to fetch the data on a read request before returning it in response to the read request.

Figure 7:
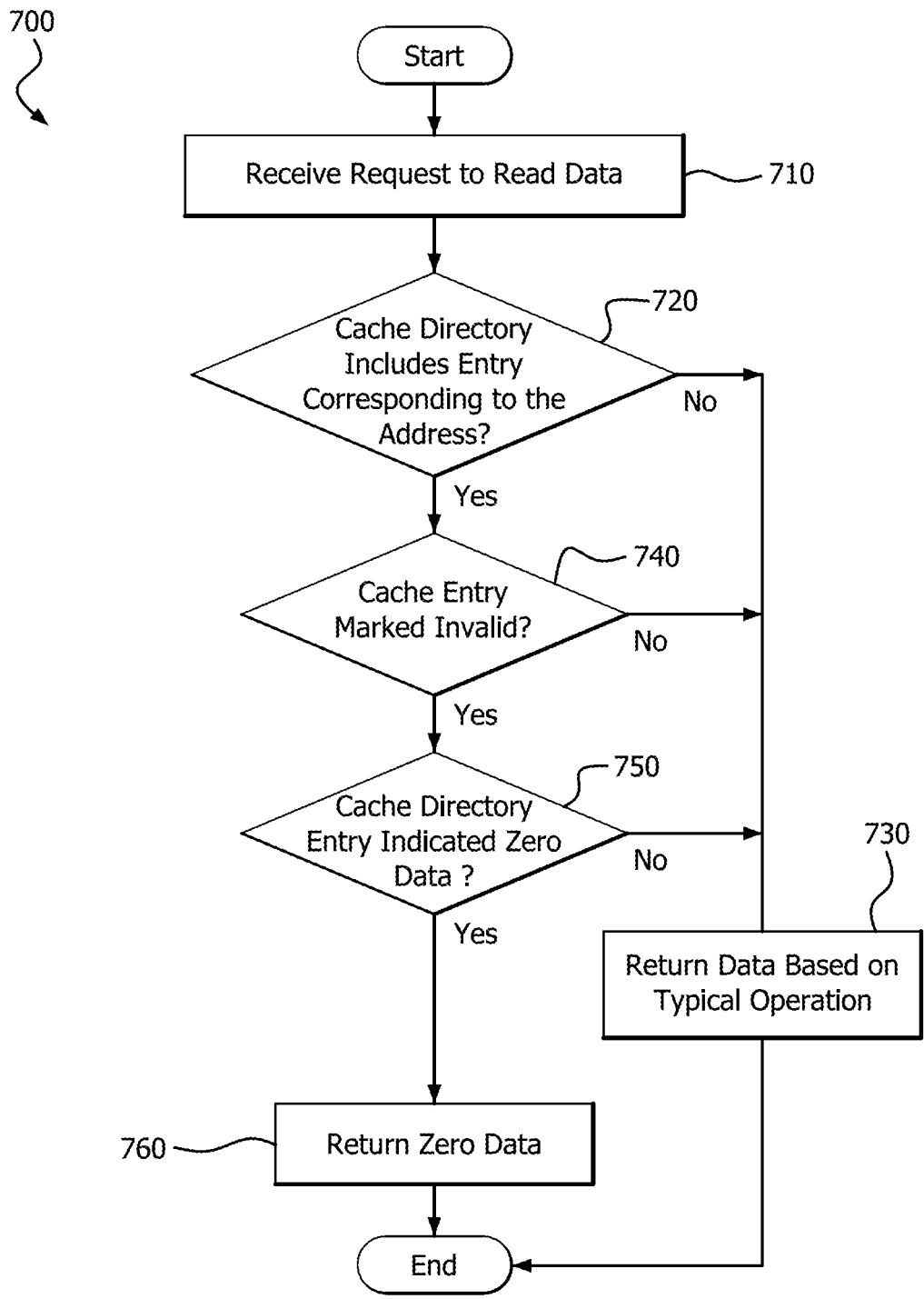
FIG. 7 is a flow chart illustrating an example method for zero data compression by a coherence management device during a read operation.

FIG. 7 is a flow chart illustrating an example method 700 for zero data compression by a coherence management device, such as a coherent slave or other suitable coherence management device, during a read operation.

In step 710, the coherence management device receives a request to read data from an address in a main memory, and the coherence management device determines whether an entry in a cache directory with which it is associated includes an entry corresponding to the memory address. In some implementations, the coherence management device makes this determination by comparing the memory address to tag fields in the cache directory entries which include memory addresses, or portions of memory addresses (or passing the request to the cache directory, which makes the comparisons). In some implementations, the request includes a non-temporal read operation. Non-temporal read operations bypass the cache structure, but are observable by the coherence management device.

On condition 720 that the cache directory does not include an entry corresponding to the address, the coherence management device handles reading of the data based on typical operations in step 730 (e.g., performs a cache directory lookup, and reads from the cache or main memory as appropriate). Otherwise, on condition 720 that the cache directory does include an entry corresponding to the address, the coherence management device determines whether the entry is invalid (e.g., has a state field indicating an invalid state or ZD state).

On condition 740 that the cache entry is not invalid, the coherence management device handles reading of the data based on typical operations in step 730. Otherwise, on condition 740 that the cache entry is invalid, the coherence management device determines whether the directory entry includes an indication that the data to be read from the address in main memory includes zero data (e.g., includes a ZD bit or ZD state).

On condition 750 that the cache entry does not include an indication that the data to be read includes zero data, the coherence management device handles reading of the data based on typical operations in step 730. Otherwise, on condition 750 that the cache entry includes an indication that the data to be read from the address in main memory includes zero data, the coherence management device returns zero data in response to the request to read data (step 760).

In some implementations, the zero data is not read from the main memory or from a cache; rather, the coherence management device (e.g., coherent slave) returns zero data in response to the read request based on the indication in the cache directory entry (e.g., ZD bit or ZD state). This can have the advantage of saving memory bandwidth in some cases.

Likewise, in some implementations the zero data is not cached (e.g., is not allocated in any of cache subsystems 414A-N). In such implementations, the zero data is not cached because the cache entry is invalid and/or in a ZD state such that zero data is returned by the coherency management device (e.g., coherent slave) without the need to fetch the data from any cache or main memory. This can have the advantage of saving bus bandwidth by not requiring a probe request to a cache to fetch the data before returning it in response to the read request.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A coherency management device, comprising:
   circuitry configured to receive a request for a non-temporal read of data stored at an address in a main memory; and
   circuitry configured to, responsive to the request for a non-temporal read, and to a cache directory including a spare, unused, or invalid directory entry:
     create a cache directory entry for the address using the spare, unused, or invalid directory entry,
     set a state of the cache directory entry to an invalid state, wherein the invalid state indicates that no cached copies of data corresponding to the address are valid, and
     set, in the cache directory entry, an indication that data corresponding to the address comprises zero data.

2. The coherency management device of claim 1, wherein the indication comprises a bit in the cache directory entry, a spare state in a state field of the cache directory entry, a bit in a state field of the cache directory entry, and/or a bit in a sharing vector field of the cache directory entry.

3. The coherency management device of claim 1, wherein the coherency management device is configured to return the zero data in response to the request without reading the main memory if the cache directory entry is invalid and includes the indication.

4. The coherency management device of claim 1, wherein the coherency management device comprises a coherent slave device, probe filter device, and/or snoop filter device.

5. The coherency management device of claim 1, wherein the coherency management device receives the request from a coherent master device.

6. The coherency management device of claim 1, wherein the cache directory entry for the address includes sharing vector that indicates which caches contain the cached copies of data corresponding to the address.

7. A method for managing cache coherence in a computer system, the method comprising:
  receiving, by a coherency management device, a request for a non-temporal read of data stored at an address in a main memory; and
  in response to the request for a non-temporal read, and to a cache directory including a spare, unused, or invalid directory entry:
    creating a cache directory entry for the address using the spare, unused, or invalid directory entry,
    setting a state of the cache directory entry to an invalid state, wherein the invalid state indicates that no cached copies of data corresponding to the address are valid, and
    setting, in the cache directory entry, an indication that data corresponding to the address comprises zero data.

8. The method of claim 7, wherein the indication comprises a bit in the cache directory entry, a spare state in a state field of the cache directory entry, a bit in a state field of the cache directory entry, and/or a bit in a sharing vector field of the cache directory entry.

9. The method of claim 7, wherein the coherency management device returns the zero data in response to the request without reading the main memory if the cache directory entry is invalid and includes the indication.

10. The method of claim 7, wherein the coherency management device receives the request from a coherent master device.

11. The method of claim 7, wherein the cache directory entry for the address includes sharing vector that indicates which caches contain the cached copies of data corresponding to the address.

12. A coherency management device comprising:
  circuitry configured to receive a request for a non-temporal write to an address in a main memory; and
  circuitry configured to, responsive to the request for the non-temporal write, and to determining that a cache directory includes including a spare, unused, or invalid directory entry:
    create a cache directory entry for the address using the spare, unused, or invalid directory entry,
    set a state of the cache directory entry to an invalid state, wherein the invalid state indicates that no cached copies of data corresponding to the address are valid, and
    set, in the cache directory entry, an indication that data corresponding to the address includes zero data.

13. The coherency management device of claim 12, wherein the data includes zero data where the data includes only zeros and/or the request includes an instruction which includes an opcode which instructs a write of zeros to the address.

14. The coherency management device of claim 12, wherein the indication comprises at least one bit in a state field of the cache directory entry, a spare state in a state field of the cache directory entry, a bit in a state field of the cache directory entry, and/or a bit in a sharing vector field of the cache directory entry.

15. The coherency management device of claim 12, wherein the coherency management device is configured to set the indication in response to the request without writing to the main memory if the data includes zero data.

16. The coherency management device of claim 12, wherein the coherency management device comprises a coherent slave device, probe filter device, and/or snoop filter device.

17. The coherency management device of claim 12, wherein the coherency management device receives the request from a coherent master device.

18. The coherency management device of claim 12, wherein the cache directory entry for the address includes sharing vector that indicates which caches contain the cached copies of data corresponding to the address.

19. A method for managing cache coherence in a computer system, the method comprising:
  receiving, by a coherency management device, a request for a non-temporal write of data to an address in a main memory; and
  in response to the request for the non-temporal write, and to a cache directory including a spare, unused, or invalid directory entry:
    creating a cache directory entry for the address using the spare, unused, or invalid directory entry,
    setting a state of the cache directory entry to an invalid state, wherein the invalid state indicates that no cached copies of data corresponding to the address are valid, and
    setting, in the cache directory entry, an indication that data corresponding to the address includes zero data.

20. The method of claim 19, wherein the data includes zero data where the data includes only zeros and/or the request includes an instruction which includes an opcode which instructs a write of zeros to the address.

21. The method of claim 19, wherein the indication comprises at least one bit in a state field of the cache directory entry, a spare state in a state field of the cache directory entry, a bit in a state field of the cache directory entry, and/or a bit in a sharing vector field of the cache directory entry.

22. The method of claim 19, wherein if the data includes zero data, the coherency management device sets the indication in response to the request without writing the main memory.

23. The method of claim 19, wherein the coherency management device comprises a coherent slave device, probe filter device, and/or snoop filter device.

24. The method of claim 19, wherein the coherency management device receives the request from a coherent master device.

25. The method of claim 19, wherein the cache directory entry for the address includes sharing vector that indicates which caches contain the cached copies of data corresponding to the address.

* * * * *